(12) United States Patent
Fuertes Moreno (10) Patent No.: US 12,544,600 B2
(45) Date of Patent: Feb. 10, 2026

(54) VEHICLE SEAT BELT FASTENING DEVICE (71) Applicant: Francisco Jose Fuertes Moreno, Alberic (ES)

(72) Inventor: Francisco Jose Fuertes Moreno, Alberic (ES)

( * ) Notice: Subject to any disclaimer, the term of this patent is extended or adjusted under 35 U.S.C. 154(b) by 0 days.

(21) Appl. No.: 18/717,776

(22) PCT Filed: Dec. 7, 2022

(86) PCT No.: PCT/ES2022/070781
§ 371 (c)(1),
(2) Date: Jun. 7, 2024

(87) PCT Pub. No.: WO2023/105105
PCT Pub. Date: Jun. 15, 2023

(65) Prior Publication Data
US 2025/0050140 A1 Feb. 13, 2025

(30) Foreign Application Priority Data
Dec. 7, 2021 (ES) ................ ES202131130

(51) Int. Cl.
*A62B 3/00* (2006.01)
*B60R 22/22* (2006.01)
*B60R 22/32* (2006.01)

(52) U.S. Cl.
CPC .............. *A62B 3/005* (2013.01); *B60R 22/22* (2013.01); *B60R 22/32* (2013.01); *B60R 2022/328* (2013.01)

(58) Field of Classification Search
CPC ... A62B 3/005; B60R 2022/328; B60R 22/22; B60R 22/32
See application file for complete search history.

(56) References Cited

U.S. PATENT DOCUMENTS 6,219,890 B1 * 4/2001 Souther .............. A44B 11/2561
24/631
10,486,643 B1 * 11/2019 Raybon .................. B60R 21/02
(Continued)

FOREIGN PATENT DOCUMENTS

CN 105644493 A * 6/2016
DE 102009015459 B3 * 5/2010 ............. B60R 22/32
(Continued)

OTHER PUBLICATIONS

Redondo , Device for Cutting a Safety Belt in an Emergency and Breaking Windows, May 26, 2017, EPO, WO 2017085336 A1, Machine Translation of Description (Year: 2017).*

(Continued)

*Primary Examiner* — Paul N Dickson
*Assistant Examiner* — Matthew D Lee
(74) *Attorney, Agent, or Firm* — Thedford I. Hitaffer; Hitaffer, PLLC (57) ABSTRACT

A vehicle seat belt fastening device is provided for a seat belt equipped with a strap and a closing mechanism. The seat belt is simultaneously linked to the vehicle floor and able to be linked in a sliding manner to the strap. Thus, the seat belt is suitable for holding the strap in relation to the closing mechanism, and therefore in relation to the vehicle floor. A tool that is able to be attached and removed in relation to the closing mechanism. The tool is also able to be manually manipulated, and to be manually attached and/or manually removed in the attachment and/or removal position thereof from the closing mechanism. The tool is equipped with means for cutting the strap and/or with means for breaking the windows of the vehicle.

18 Claims, 9 Drawing Sheets

(56) References Cited

U.S. PATENT DOCUMENTS

| | | | | |
|---|---|---|---|---|
| 2004/0050608 A1* | 3/2004 | MacDougall | ........... | B60R 22/00 |
| | | | | 180/271 |
| 2004/0140142 A1* | 7/2004 | MacDougall | ........... | B60R 22/00 |
| | | | | 180/271 |
| 2004/0140589 A1* | 7/2004 | Souther | ................... | B29C 45/00 |
| | | | | 164/113 |
| 2017/0158164 A1* | 6/2017 | Crouch | ................... | B60R 22/18 |
| 2018/0250533 A1* | 9/2018 | Petersen | .............. | A44B 11/005 |
| 2018/0250534 A1* | 9/2018 | Riley | ................. | A44B 11/2561 |
| 2019/0283705 A1* | 9/2019 | Gutierrez | ................ | B60R 22/32 |
| 2020/0172045 A1* | 6/2020 | Zayas | .................... | B60R 22/32 |
| 2022/0402456 A1* | 12/2022 | Counts | .................... | B60R 22/32 |

FOREIGN PATENT DOCUMENTS

| | | | | | |
|---|---|---|---|---|---|
| FR | 2723023 A1 | * | 2/1996 | ............ | B26B 27/00 |
| JP | 2005132136 A | * | 5/2005 | | |
| KR | 970039742 A | * | 7/1997 | | |
| NL | 2023172 B1 | * | 12/2020 | ............ | B25H 3/006 |
| WO | 03089278 A1 | | 10/2003 | | |
| WO | WO-2017085336 A1 | * | 5/2017 | ............ | B60R 22/32 |
| WO | 2018222538 A1 | | 12/2018 | | |

OTHER PUBLICATIONS

European Patent Office, International Search Report dated Mar. 30, 2023 in International Patent Application No. PCT/ES2022/070781 filed Dec. 7, 2022.

European Patent Office, Written Opinion dated Mar. 30, 2023 in International Patent Application No. PCT/ES2022/070781 filed Dec. 7, 2022.

\* cited by examiner

VEHICLE SEAT BELT FASTENING DEVICE

CROSS-REFERENCE TO RELATED APPLICATIONS

This application, filed under 35 USC 371, is a United States National Stage Application of International Application No. PCT/ES2022/070781, filed Dec. 7, 2022, which claims priority to ES Application No. P202131130, filed on Dec. 7, 2021, the disclosures of which are incorporated herein by reference in their entirety.

OBJECT OF THE INVENTION

The aim of this invention application is to register a vehicle seat belt fastening device which incorporates noteworthy innovations and advantages with respect to the techniques used hitherto.

More specifically, the invention proposes the development of a vehicle seat belt fastening device which, due to the particular arrangement thereof, allows for a simple, effective and safe fastening of a vehicle seat belt and, at the same time, in the event of an emergency and/or accident, allows for the usual strap of a vehicle seat belt and/or the windows of the same vehicle to be broken if the normal opening and closing mechanism of the same seat belt is locked and does not allow for a conventional opening thereof, the same being the case for the doors of the same vehicle, thereby allowing a user to be released and to exit the vehicle in the event of an emergency and/or accident.

BACKGROUND OF THE INVENTION

Seat belts intended for and used by the driver and other occupants of a vehicle are known in the current state of the art.

Despite the very good safety features known and provided by said known seat belts, circumstances may occur in which during an emergency and/or accident, the opening and closing mechanism of the seat belt fails and is locked, unable to be opened, and furthermore, the doors of the same vehicle could be locked as well, also being unable to be opened.

Accordingly, it could be that in the event of an accident an occupant of a vehicle is trapped inside the same after an accident or emergency for a period of time which may be decisive in saving the person's life.

This circumstance can become especially dangerous in extreme situations for the user, such as the vehicle falling or sinking into water, a vehicle fire, etc., in which it is necessary for the user to quickly release the seat belt and immediately exit the vehicle.

In other words, the seat belt can become a death trap for a person who is unable to release it.

The present invention contributes to solving the present problem by allowing for a simple, effective and safe fastening of a vehicle seat belt and, at the same time, in the event of an emergency and/or accident, allowing for the usual strap of a vehicle seat belt and/or the windows of the same vehicle to be broken if the normal opening and closing mechanism of the same seat belt is locked and does not allow for a conventional opening thereof, the same being the case for the doors of the same vehicle, thereby allowing a user to be released and to exit the vehicle in the event of an emergency and/or accident.

DESCRIPTION OF THE INVENTION

The present invention has been developed with the aim of providing a vehicle seat belt fastening device, said seat belt being equipped with a strap and a closing mechanism, said closing mechanism being simultaneously linked to the vehicle floor and also enabled to be linked in a sliding manner to the strap, the seat belt thus being suitable for holding said strap in relation to the closing mechanism, and therefore in relation to the vehicle floor, which comprises a tool that is enabled to be attached and removed in relation to said closing mechanism, said tool also being enabled to be manually manipulated, and to be manually attached and/or manually removed in the attachment and/or removal position thereof from the closing mechanism, said tool being provided with means for cutting the strap and/or with means for breaking the windows of the vehicle.

Alternatively, the vehicle seat belt fastening device further comprises a first part and a second part, both of which are enabled to be comprised in the same closing mechanism, in which the first part is enabled to be linked in a sliding manner to the seat belt strap, and the second part is enabled to be comprised in the closing mechanism such that it is linked to the vehicle floor, the first part and the second part being mutually couplable, the first part remaining linked in a sliding manner to the strap and the same second part remaining linked to the vehicle floor, the first part, the second part and the tool being mutually enabled for a simultaneous insertion and/or passage of said tool through the first part and over a top surface on the second part in the coupling of the latter two, the tool therefore being able to be attached to the closing mechanism by means of the passage thereof over a top surface on the second part; the first part and the second part also being able to be attached to each other in the coupling thereof by means of the simultaneous insertion and/or passage of the tool.

In the vehicle seat belt fastening device, the tool preferably has an extension by way of a pin enabled for the simultaneous insertion and/or passage thereof through the first part and over a top surface on the second part.

In an alternative embodiment of the vehicle seat belt fastening device, the first part has a bulge with a through hole and the second part has a through opening, the first part and the second part being mutually enabled to be coupled by means of the passage and fitting of the bulge in the through hole, said positioning being suitable for the passage of the tool extension through the through hole of the bulge.

In the vehicle seat belt fastening device, the extension is preferably connected to the rest of the tool by means of a joint, such that in a condition of use the extension is simultaneously inserted and/or in a through position in the first part and over a top surface on the second part, the rest of the tool being able to rotate about said joint and foldable on said extension, the same extension being inserted and/or in a through position in the first part and over a top surface on the second part at the same time.

In an alternative embodiment of the vehicle seat belt fastening device, the rest of the tool has a slot, so that in the folded position of the rest of the tool on the extension thereof, the rest of the tool is coupled in the bulge of the first part by means of the slot.

In the vehicle seat belt fastening device, the cutting means and the breaking means are preferably arranged in the rest of the tool that is able to rotate about the joint and is foldable on said extension.

The vehicle seat belt fastening device preferably incorporates a safety sealing mechanism enabled to keep the tool in the simultaneous insertion and/or passage position of said tool through the first part and over a top surface on the second part in the coupling thereof.

In an alternative embodiment of the vehicle seat belt fastening device, the sealing mechanism comprises a pin that is mutually enabled with the extension and the rest of the tool, allowing for a simultaneous passage of said pin through the extension and through the rest of the tool in the condition of use in which the extension is simultaneously inserted and/or in a through position in the first part and over a top surface on the second part, and in which the rest of the tool is in a folded position on said extension, while the same extension is inserted and/or in a through position in the first part and the second part at the same time.

Alternatively, in the vehicle seat belt fastening device, the extension and the rest of the part have through holes suitable for the pin to simultaneously pass therethrough.

In another alternative embodiment, the vehicle seat belt fastening device comprises an anchoring part enabled to be comprised in the same closing mechanism and also to be linked in a sliding manner to the seat belt strap, the tool and said anchoring part being mutually enabled for the mutual coupling thereof, such that the tool is enabled to be attached and removed in relation to said closing mechanism by means of said coupling between the tool and the anchoring part.

In the vehicle seat belt fastening device, the tool and the anchoring part are preferably mutually enabled for a simultaneous insertion and/or passage of said tool through the anchoring part, the tool thus being able to be attached to the closing mechanism by means of the insertion and/or passage thereof through the anchoring part.

Additionally, in the vehicle seat belt fastening device, the tool has an extension by way of a pin enabled for the simultaneous insertion and/or passage thereof through the anchoring part.

In an alternative embodiment of the vehicle seat belt fastening device, the anchoring part has a bulge with a through hole, the extension of the tool and the through hole of the bulge being mutually enabled for a passage and insertion of the extension through the through hole.

In the vehicle seat belt fastening device, the extension is preferably joined to the rest of the tool by means of a joint, such that in a condition of use the extension is inserted and/or in a through position in the anchoring part, the rest of the tool being able to rotate about said joint and foldable on said extension, while the same extension is inserted and/or in a through position in the anchoring part at the same time.

In an alternative embodiment of the vehicle seat belt fastening device, the rest of the tool has a slot, such that in the folded position of the rest of the tool on the extension thereof, the rest of the tool is coupled to the bulge of the anchoring part by means of the slot.

In the vehicle seat belt fastening device, the cutting means and the breaking means are preferably arranged in the rest of the tool that is able to rotate about the joint and is foldable on said extension.

The vehicle seat belt fastening device preferably incorporates a safety sealing mechanism enabled to keep the tool in the insertion and/or passage position of said tool through the anchoring part.

In an alternative embodiment of the vehicle seat belt fastening device, the sealing mechanism comprises a pin that is mutually enabled with the extension and the rest of the tool, allowing for a simultaneous passage of said pin through the extension and through the rest of the tool in the condition of use in which the extension is inserted and/or in a through position in the anchoring part, and in which the rest of the tool is in a folded position on said extension while the same extension is inserted and/or in a through position in the anchoring part at the same time.

Additionally, in the vehicle seat belt fastening device, the extension and the rest of the part have through holes suitable for the pin to simultaneously pass therethrough.

In the vehicle seat belt fastening device, the cutting means preferably comprise a blade arranged in the tool.

In the vehicle seat belt fastening device, the cutting means preferably comprise a diamond tip arranged on the tool.

Thanks to the present invention, a simple, effective and safe fastening of a vehicle seat belt is achieved which, at the same time, in the event of an emergency and/or accident, allows for the usual strap of a vehicle seat belt and/or the windows of the same vehicle to be broken if the normal opening mechanism of the same seat belt is locked and does not allow for a conventional opening thereof, the same being the case for the doors of the same vehicle, thereby allowing a user of the same seat belt to be released and to exit the vehicle in the event of an emergency and/or accident.

Other features and advantages of the vehicle seat belt fastening device will become apparent from the description of a preferred but non-exclusive embodiment illustrated by way of non-limiting example in the attached drawings, in which:

DESCRIPTION OF A PREFERRED EMBODIMENT

The vehicle seat belt fastening device of the invention is designed to be used on a seat belt which, in turn, is equipped with a strap and a closing mechanism. In turn, said closing mechanism is linked to the vehicle floor and also simultaneously enabled to be linked in a sliding manner to the strap. As a result, the aforementioned seat belt is, in turn, suitable for holding said strap in relation to the closing mechanism, and therefore in relation to the vehicle floor, with an arrangement that can also be similar to that which is already known in the state of the art.

Figure 1:
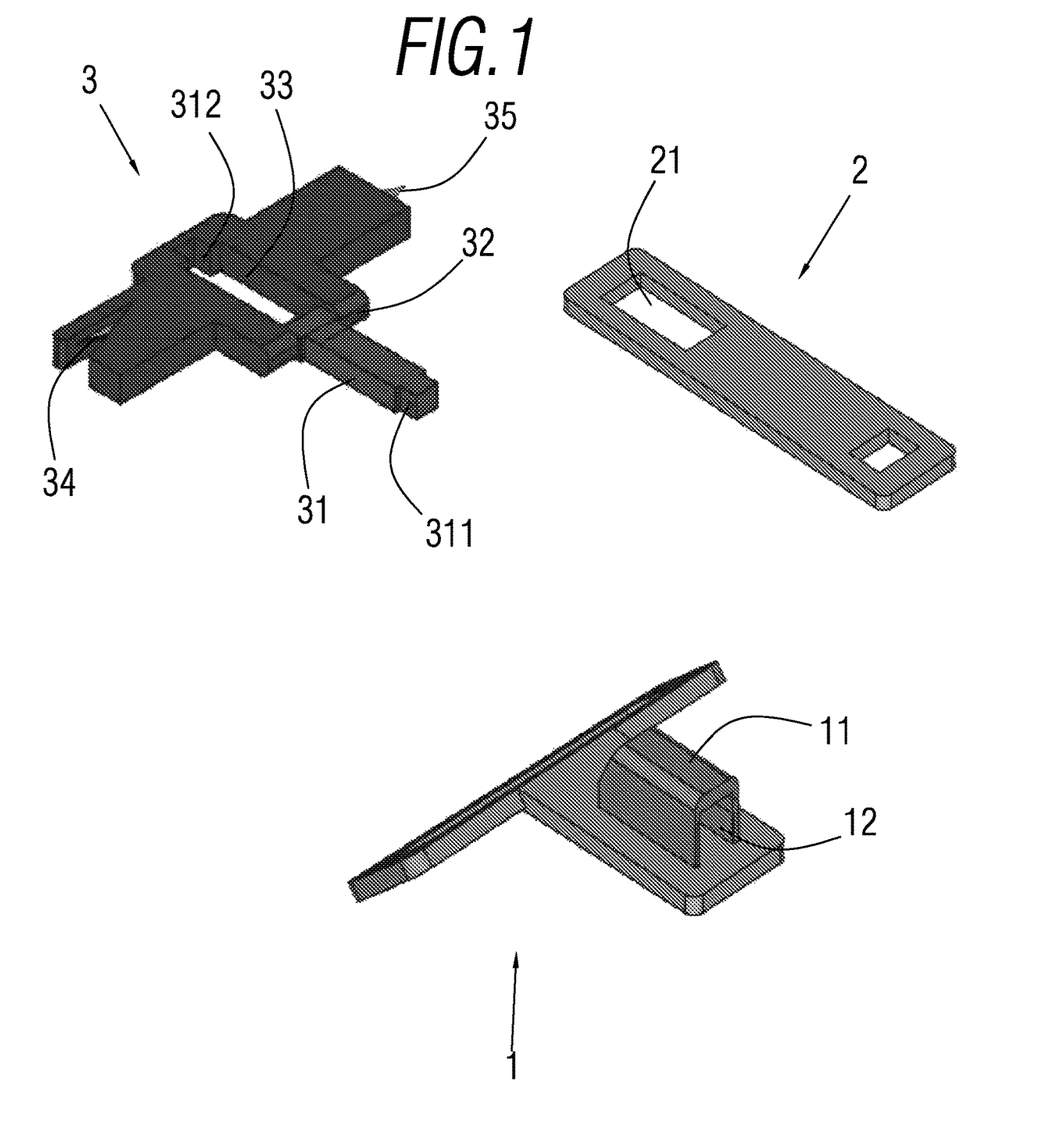
FIG. 1 is a schematic exploded view of a preferred embodiment of the vehicle seat belt fastening device of the present invention.

Already in accordance with the invention itself, in this preferred embodiment, as FIG. 1 shows in a schematic exploded view, the vehicle seat belt fastening device of the proposed invention comprises a first part 1, a second part 2 and a tool 3, all of which are differentiated.

The first part 1 and the second part 2 are both enabled to be comprised in the same closing mechanism, such that the first part 1 is enabled to be linked in a sliding manner to the seat belt strap, as already occurs in the state of the art, and the second part 2 is enabled to be comprised in the closing mechanism, such that it is linked to the vehicle floor.

Figure 2:
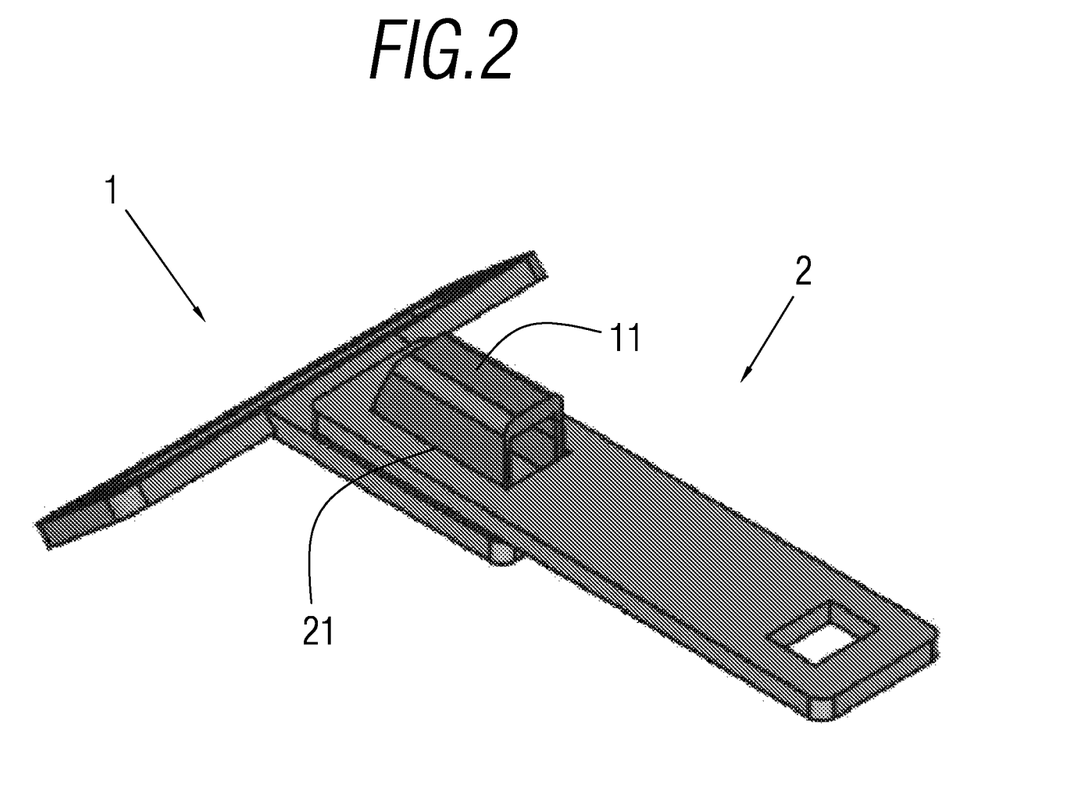
FIG. 2 is a schematic and partial view of a preferred embodiment of the vehicle seat belt fastening device of the present invention.

As can be seen schematically in FIG. 2, the first part 1 and the second part 2 are enabled to be mutually couplable, the first part 1 remaining linked in a sliding manner to the strap and the same second part 2 remaining linked to the vehicle floor. The strap and the complete closing mechanism of the seat belt are not represented in the drawings.

Thus, in this preferred embodiment, the first part 1 has a bulge 11 with a through hole 12 and the second part 2 has a through opening 21. In the coupling of the first part 1 to the second part 2, as can be seen in FIG. 2, the bulge 11 of the first part 1 is fitted and in a through arrangement in the through opening 21 of the second part 2.

Furthermore, the first part 1, the second part 2 and the tool 3 are mutually enabled for a simultaneous insertion and/or passage of said tool 3 through the first part 1 and over a top surface on the second part 2 when these parts are already coupled. Accordingly, the first part 1 and the second part 2 are also able to be attached to each other in the coupling thereof by the simultaneous insertion and/or passage of the tool 3 through the same.

In this preferred embodiment, the tool 3 has an extension 31 by way of a pin enabled for the simultaneous insertion and/or passage thereof through the first part 1 and over a top surface on the second part 2.

Figure 3:
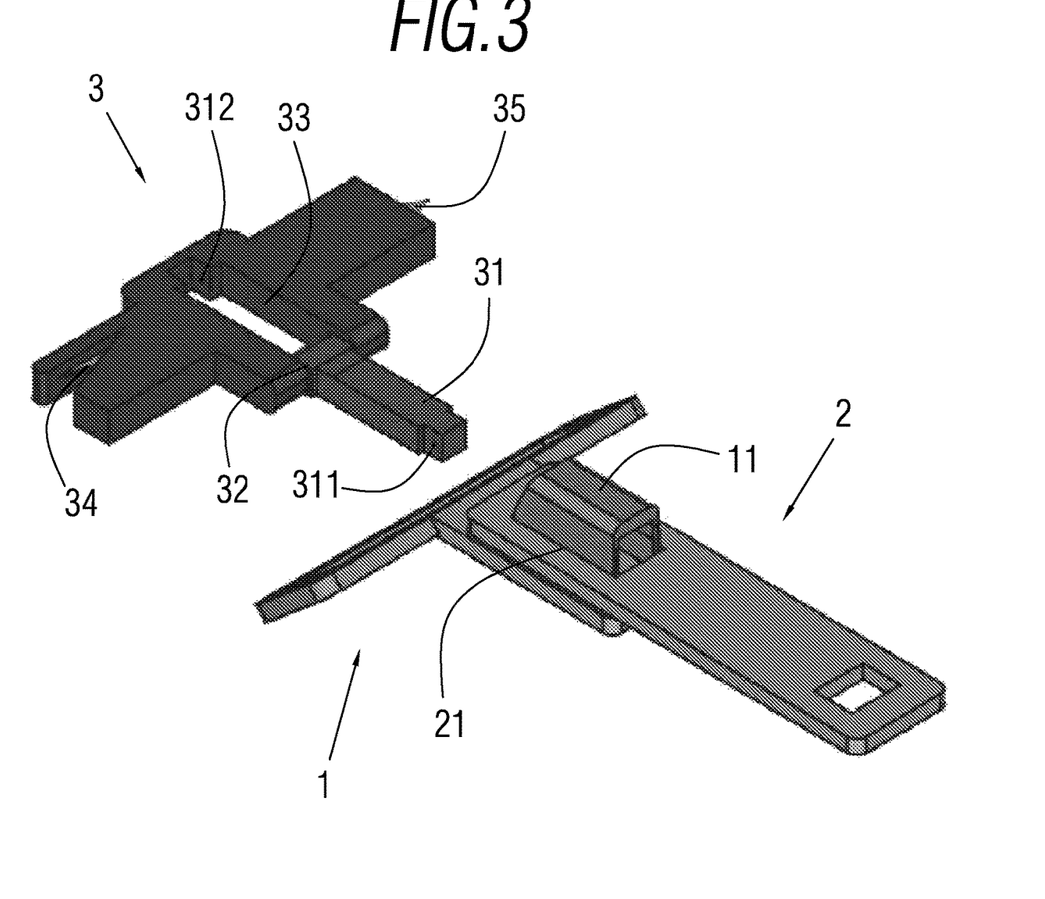
FIGS. 3, 4, 5 and 6 are schematic and sequential views showing a fastening and unfastening of a preferred embodiment of the vehicle seat belt fastening device of the present invention.
Figure 4:
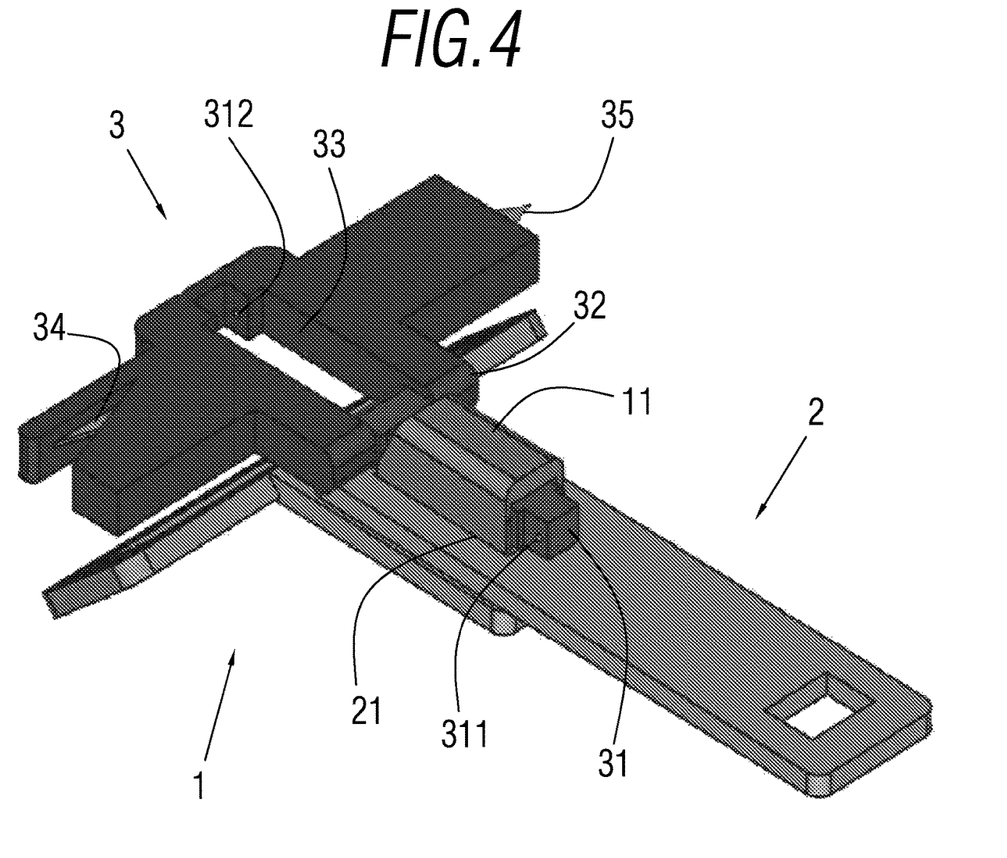

Furthermore, and also in this preferred embodiment, and as can be seen in FIGS. 1, 3 and 4, the extension 31 is connected to the rest of the tool 3 by means of a joint 32.

In one use of the vehicle seat belt fastening device of the invention, as represented sequentially in FIGS. 3, 4, 5 and 6, the extension 31 of the tool 3 is inserted in the through hole 12 of the bulge 11 of the first part 1 when the same is coupled to the second part 2, whereby the first part 1 and the second part 2 are attached to each other in the coupling thereof by the simultaneous insertion and/or passage of the tool 3 through the same.

Figure 5:
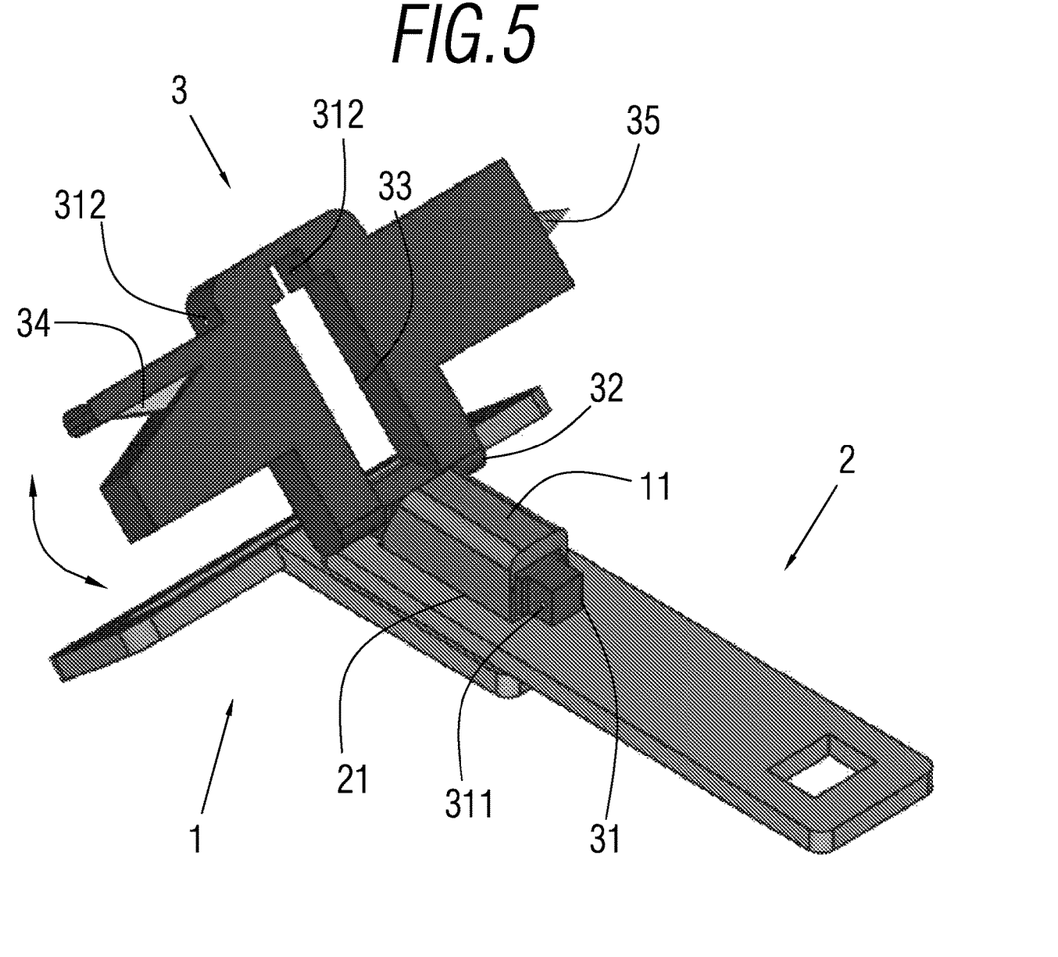

Accordingly, as shown in FIG. 5, in a condition of use, the extension 31 is simultaneously inserted and/or in a through position in the first part 1 and over a top surface on the second part 2, the rest of the tool 3 being able to rotate about said joint 32, as can be seen by the arrows in FIG. 5, and as a result, foldable on said extension 31, while the same extension 31 is inserted and/or in a through position in the first part 1 and over a top surface on the second part 2 at the same time.

Figure 6:
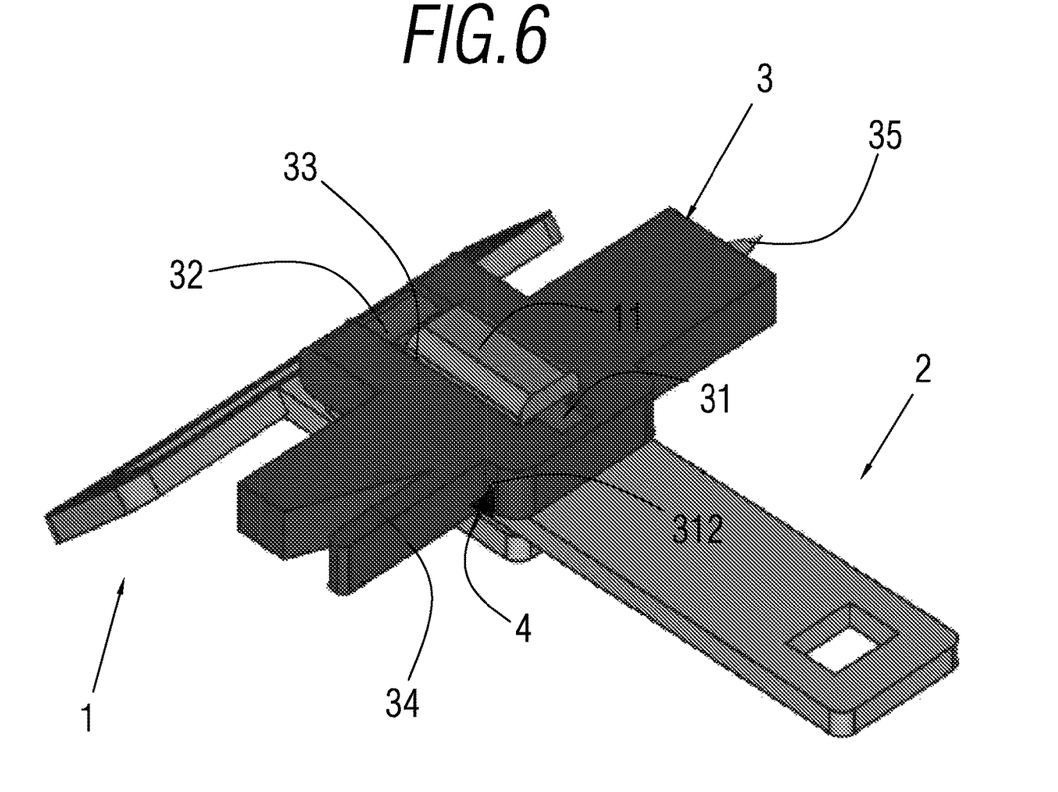

Lastly, as can be seen in FIG. 6, by folding down the rest of the tool 3 on the extension 31, the rest of the tool 3 is coupled to the bulge 11 of the first part 1 by means of a slot 33 or opening provided in the same tool 3.

In this way, and as schematically represented in FIG. 6, when used, the vehicle seat belt fastening device of the invention has a fastened arrangement, with the same effectiveness and service as the closing mechanisms of vehicle safety belts known in the state of the art.

Furthermore, in this preferred embodiment, the vehicle seat belt fastening device of the invention incorporates a safety sealing mechanism, enabled to keep the tool 3 in the simultaneous insertion and/or passage position through the first part 1 and over a top surface on the second part 2 in the coupling thereof, thus ensuring the fastening of the vehicle seat belt fastening device of the invention.

Figure 7:
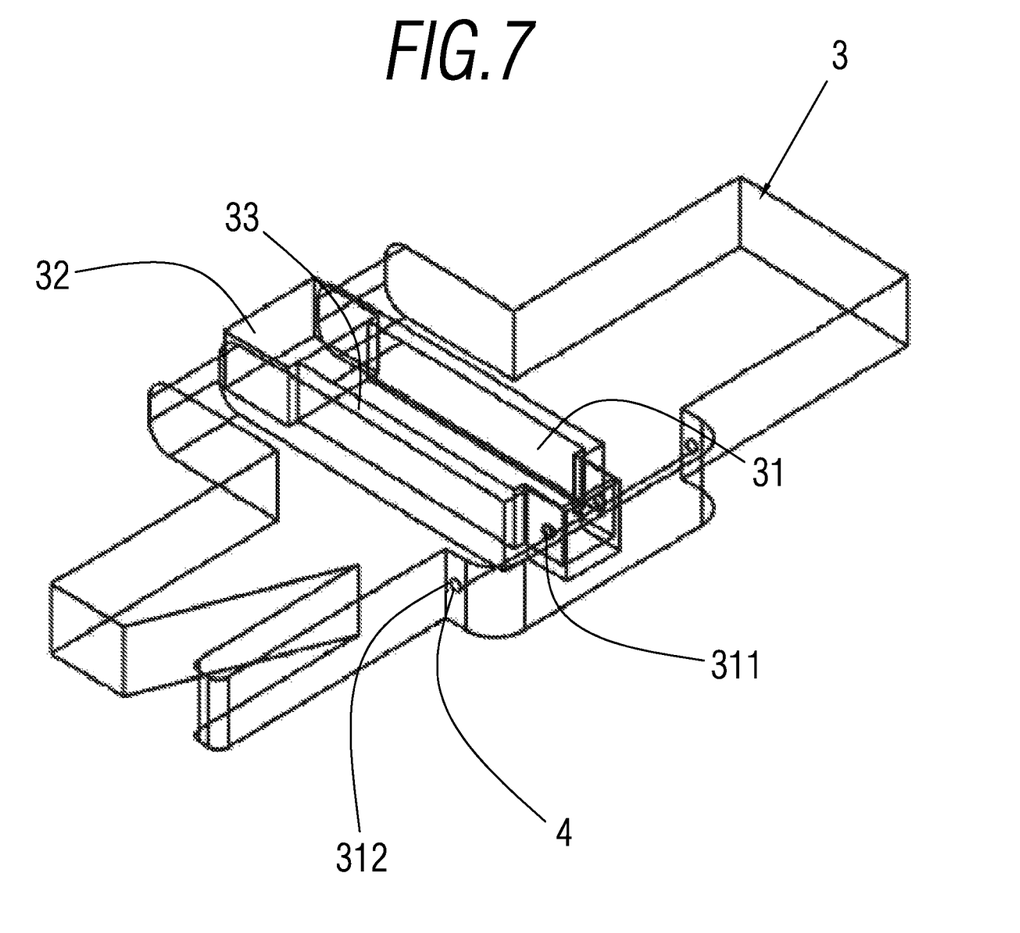
FIG. 7 is a schematic view showing the arrangement of a safety sealing mechanism of a preferred embodiment of the vehicle seat belt fastening device of the present invention.

Likewise, in this preferred embodiment, as schematically represented in FIGS. 6 and 7, the safety sealing mechanism comprises a pin 4. Said pin 4, the extension 31 and the rest of the tool 3 are mutually enabled, so that said pin 4 can simultaneously pass through extension 31 and, at the same time, through the rest of the tool 3.

To do so, as can be seen in FIGS. 1, 3, 4, 5, 6 and 7, the extension 31 and the rest of the part 3 have through holes 311, 312, suitable for the pin 4 to simultaneously pass therethrough.

All of this is done in the condition of use described above in which the extension 31 is simultaneously inserted and/or in a passing position in the first part 1 and in the second part 2, and in which the rest of the tool 3 is in a folded position on said extension 31, the same extension 31 being inserted and/or in a passing position in the first part 1 and over a top surface on the second part 2 at the same time.

By means of the aforementioned pin 4 in a passing position through the extension 31 and through the rest of the tool 3 at the same time, the tool 3 cannot be moved from the position thereof, represented in FIGS. 6 and 7, which means that the first part 1 and the second part 2 cannot be separated, and therefore the vehicle seat belt fastening device of the invention remains secured and sealed in the fastened position thereof.

In addition to all of this, in the vehicle seat belt fastening device of the invention, the tool 3 is enabled for the manual manipulation thereof, and more particularly, for the manual insertion and manual removal thereof in the simultaneous insertion and/or passage position through the first part 1 and over a top surface on the second part 2. To remove the tool 3, in this preferred embodiment, the pin 4 must be previously removed from the position thereof, as shown in FIGS. 6 and 7.

Also in the vehicle seat belt fastening device of the invention, the tool 3 is provided with means for cutting the strap and/or with means for breaking the windows of the vehicle.

In this preferred embodiment of the vehicle seat belt fastening device of the invention, the cutting means comprise a blade 34 arranged in the tool 3, and the breaking means comprise a diamond tip 35 arranged in the tool 3.

Figure 8:
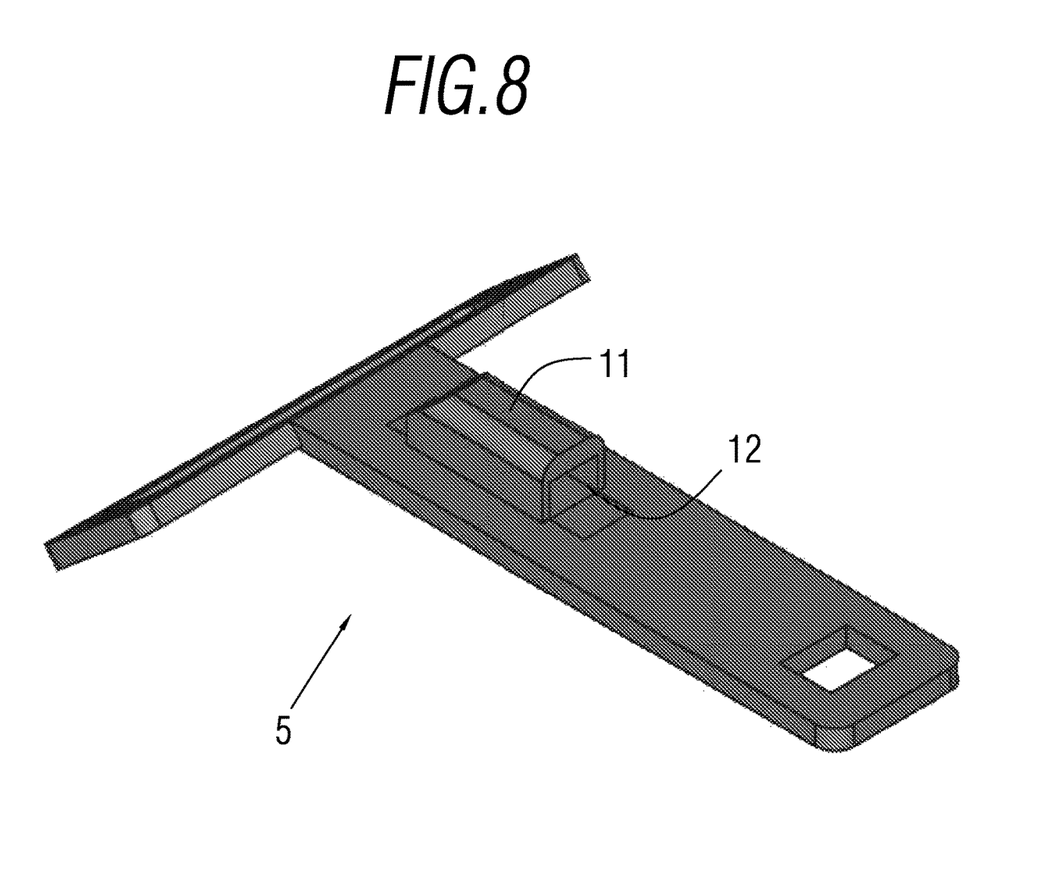
FIGS. 8 and 9 are schematic views of another preferred embodiment of the vehicle seat belt fastening device of the present invention.
Figure 9:
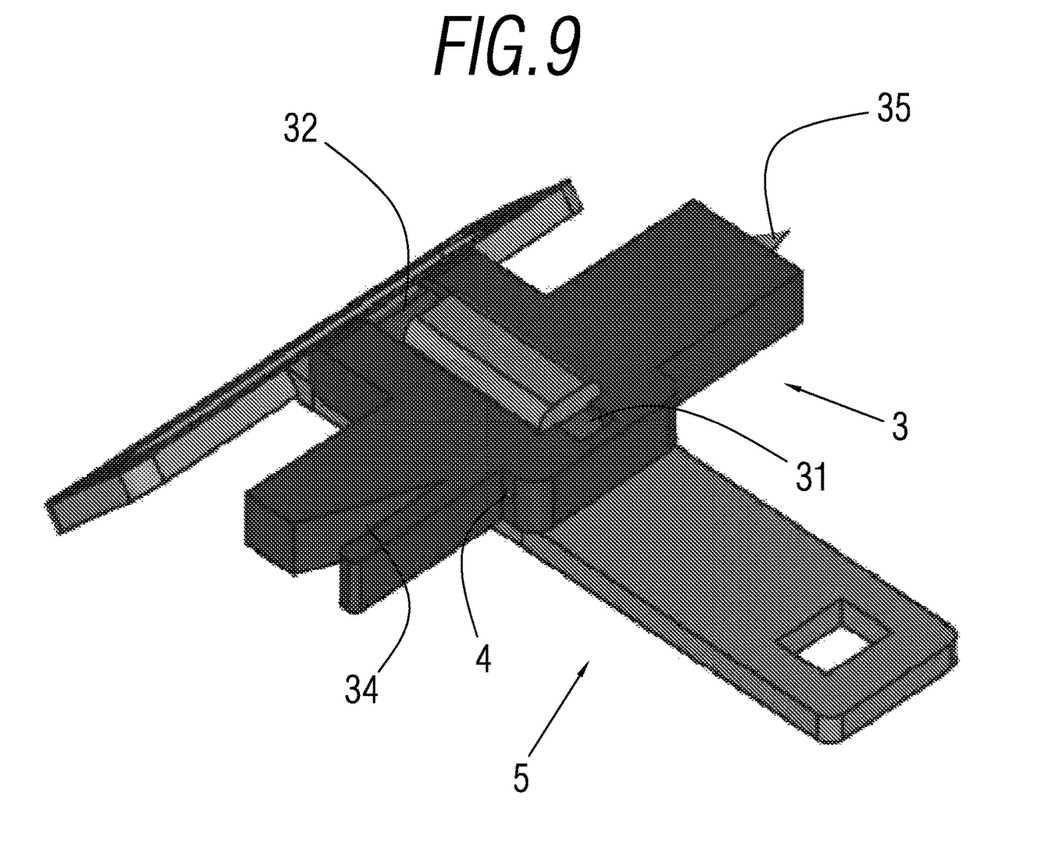

In another preferred embodiment, for example in a more simplified arrangement, represented in FIGS. 8 and 9, the vehicle seat belt fastening device of the invention comprises an anchoring part 5 in addition to the tool 3.

Said anchoring part 5 is enabled to be comprised in the same closing mechanism and, moreover, it is also enabled to be linked in a sliding manner to the seat belt strap, for example in a manner similar to that which is known in the state of the art.

The tool 3 and the anchoring part 5 are mutually enabled for the mutual coupling thereof, such that the tool 3 is enabled to be attached and removed in relation to said closing mechanism by means of the aforementioned coupling between the tool 3 and the anchoring part 5.

In a similar way to the other preferred embodiment explained above in FIGS. 1 to 7, and as represented in FIGS. 8 and 9, the tool 3 and the anchoring part 5 are mutually enabled for an insertion and/or passage of said tool 3 through the anchoring part 5, and therefore the tool 3 being able to be attached in the closing mechanism by means of the insertion and/or passage thereof through the anchoring part 5.

As can be seen in FIGS. 8 and 9, the tool 3 has an extension 31 by way of a pin enabled for the insertion and/or passage thereof through the anchoring part 5.

The anchoring part 5 also has a bulge 11 with a through hole 12, the extension 31 of the tool 3 and the through hole 12 of the bulge 11 being mutually enabled for the passage and insertion of the extension 31 through the through hole 12.

In addition, and in a similar manner to FIGS. 4, 5 and 6 of the previous preferred embodiment, the extension 31 is connected to the rest of the tool 3 by means of a joint 32, such that in a condition of use the extension 31 is inserted and/or in a through position in the anchoring part 5, the rest of the tool 3 being able to rotate about said joint 32 and being foldable on said extension 31, the same extension 31 being inserted and/or in a through position in the anchoring part 5 at the same time, as can be seen in FIG. 9.

In the same manner as in FIGS. 4, 5 and 6 of the other previous preferred embodiment, the rest of the tool 3 has a slot 33, such that in the folded position of the rest of the tool 3 on the extension 31 thereof, the rest of the tool 3 is coupled to the bulge 11 of the anchoring part 5 by means of the slot 33, as can be seen in FIG. 9.

Likewise, the cutting means and the breaking means are arranged in the rest of the tool 3, which is able to rotate around the joint 32 and is foldable on said extension 31.

Likewise, in this preferred embodiment of the vehicle seat belt fastening device of the invention, the cutting means comprise a blade 34 arranged in the tool 3, and the breaking means comprise a diamond tip 35 arranged in the tool 3.

In a similar way to the previous preferred embodiment, in this other preferred embodiment, shown in FIGS. 8 and 9, the vehicle seat belt fastening device of the invention incorporates a safety sealing mechanism, enabled to keep the tool 3 in the insertion and/or passage position thereof through the anchoring part 5, thus ensuring the positioning of the tool 3 of the vehicle seat belt fastening device of the invention.

Also in this preferred embodiment, as schematically represented in FIG. 9 and in FIG. 7 of the previous embodiment, the safety sealing mechanism comprises a pin 4. Said pin 4, the extension 31 and the rest of the tool 3 are mutually enabled, so that said pin 4 can simultaneously pass through the extension 31 and through the rest of the tool 3 at the same time.

To do so, as can be seen in FIGS. 7 and 9, the extension 31 and the rest of the tool 3 have through holes 311, 312 suitable for the pin 4 to simultaneously pass therethrough.

All of this is done in the condition of use in which the extension 31 is inserted and/or in a passing position through the anchoring part 5, and in which the rest of the tool 3 is in a folded position on said extension 31, the same extension 31 being inserted and/or in a through position in the anchoring part 5 at the same time.

By means of the aforementioned pin 4 in a passing position through the extension 31 and through the rest of the tool 3 at the same time, the tool 3 cannot be moved from the position thereof in the anchoring part 5, represented in FIGS. 7 and 9, and therefore remains positioned and attached in the closing mechanism.

Due to all of the aforementioned points, the vehicle seat belt fastening device of the invention has the great added advantage during use that after removing the tool 3, the same can be used to cut the strap and to break the windows of the vehicle and to allow the occupants to exit same.

Indeed, in the manual manipulation and removal of the tool 3 by the user and, for example, in a reverse manner to that which is sequentially indicated in FIGS. 3, 4, 5 and 6, by means of the cutting means of the same tool 3 in these preferred embodiments it is possible for the blade 34 to cut the strap and thereby release the user in the event that the opening of the seat belt closure is locked.

Likewise, in the event of an accidental locking of the exit doors of the vehicle, the user, by grasping the tool 3 and using the breaking means, which in these preferred embodiments is the diamond tip 35, can strike and break the vehicle windows and thus be able to exit the vehicle.

Thanks to the vehicle seat belt fastening device of the proposed invention, in addition to achieving a simple, effective and safe fastening of a vehicle seat belt, in the event of an emergency and/or accident, the user can break the usual strap of a vehicle seat belt and/or break the windows of the vehicle when the normal opening and closing mechanism of the same seat belt is eventually locked and does not allow for a conventional opening thereof, the same being the case for the doors, thereby allowing a user to be released and to exit the vehicle in the event of an emergency and/or accident.

The simplicity of the vehicle seat belt fastening device of the proposed invention allows for the incorporation thereof into seat belts of all vehicles, as it is based on the same standard mechanism for connecting the seat belt and the closure thereof.

The details, shapes, dimensions and other secondary elements, as well as the materials used in manufacturing the vehicle seat belt fastening device of the invention, may be suitably replaced with others that are technically equivalent and do not depart from the essential nature of the invention or from the scope defined by the claims included below.

The invention claimed is:

1. A vehicle seat belt fastening device, the seat belt being equipped with a strap and a closing mechanism, the closing mechanism being simultaneously linked to the vehicle floor and also enabled to be linked in a sliding manner to the strap, the seat belt therefore being suitable for holding the strap in relation to the closing mechanism, and therefore in relation to the vehicle floor, the device further comprising a tool that is enabled for the attachment and removal thereof in relation to the closing mechanism, the tool also being enabled for the manual manipulation thereof and for the manual attachment and manual removal thereof in an attachment and/or removal position thereof from the closing mechanism, the tool being equipped with means for cutting the strap and/or with means for breaking the windows of the same vehicle; wherein the closing mechanism comprises a first part and a second part, both enabled to be comprised in the same closing mechanism, in which the first part is enabled to be linked in a sliding manner to the strap of the seat belt, and the second part is enabled to be comprised in the closing mechanism, such that it is linked to the vehicle floor, the first part and the second part being mutually couplable, the first part also remaining linked in a sliding manner to the strap and the same second part remaining linked to the vehicle floor, the first part, the second part and the tool being mutually enabled for a simultaneous insertion and/or as sage of the tool through the first part and over a top surface on the second part in the coupling of the latter two, the tool thus being able to be attached to the closing mechanism by means of the passage thereof over a top surface on the second part, and furthermore, the first part and the second part being also able to be attached to each other in the coupling thereof by means of the simultaneous insertion and/or passage of the tool.

2. The vehicle seat belt fastening device according to claim 1, wherein the tool has an extension by way of a pin enabled for the simultaneous insertion or passage thereof through the first part and over a top surface on the second part.

3. The vehicle seat belt fastening device according to claim 2, wherein the first part has a bulge with a through hole, and the second part has a through opening, the first part and the second part being mutually enabled for the coupling thereof by means of the passage and fitting of the bulge in the through opening, the positioning being suitable for a passage and insertion of the extension of the tool through the through hole of the bulge.

4. The vehicle seat belt fastening device according to claim 2, wherein the extension is connected to the rest of the tool by means of a joint, such that in a condition of use, the extension is simultaneously inserted or in a through position in the first part and over a top surface on the second part, the rest of the tool being able to rotate about the joint and foldable on the extension, while the same extension is inserted or in a through position in the first part and over a top surface on the second part at the same time.

5. The vehicle seat belt fastening device according to claim 4, wherein the rest of the tool has a slot, such that in the folded position of the rest of the tool on the extension thereof, the rest of the tool is coupled to the bulge of the first part through the slot.

6. The vehicle seat belt fastening device according to claim 4, wherein the cutting means and the breaking means are arranged in the rest of the tool, which is able to rotate about the joint and able to fold on the extension.

7. The vehicle seat belt fastening device according to claim 4, further comprising a safety sealing mechanism enabled to keep the tool in the simultaneous insertion or passage position of the tool through the first part and over a top surface on the second part in the coupling thereof.

8. The vehicle seat belt fastening device according to claim 7, wherein the sealing mechanism comprises a pin that is mutually enabled with the extension and the rest of the tool, allowing for a simultaneous passage of the pin through the extension and through the rest of the tool in the condition of use in which the extension is simultaneously inserted or in a through position in the first part and over a top surface on the second part, and in which the rest of the tool is in a folded position on the extension, while the same extension is inserted or in a through position in the first part and the second part at the same time.

9. The vehicle seat belt fastening device according to claim 8, wherein the extension and the rest of the part have through holes suitable for the pin to simultaneously pass therethrough.

10. The vehicle seat belt fastening device according to claim 1, wherein the cutting means comprise a blade arranged in the tool.

11. The vehicle seat belt fastening device according to claim 1, wherein the breaking means comprise a diamond tip arranged in the tool.

12. A vehicle seat belt fastening device, the seat belt being equipped with a strap and a closing mechanism, the closing mechanism being simultaneously linked to the vehicle floor and also enabled to be linked in a sliding manner to the strap, the seat belt therefore being suitable for holding the strap in relation to the closing mechanism, and therefore in relation to the vehicle floor, the device further comprising a tool that is enabled for the attachment and removal thereof in relation to the closing mechanism, the tool also being enabled for the manual manipulation thereof and for the manual attachment and manual removal thereof in an attachment and/or removal position thereof from the closing mechanism, the tool being equipped with means for cutting the strap and/or with means for breaking the windows of the same vehicle, the device further comprising an anchoring part enabled to be comprised in the same closing mechanism and also to be linked in a sliding manner to the seat belt strap, the tool and the anchoring part being mutually enabled for the mutual coupling thereof, such that the tool is enabled to be attached and removed in relation to the closing mechanism by means of the coupling between the tool and the anchoring part, wherein the tool and the anchoring part are mutually enabled for a simultaneous insertion or passage of the tool through the anchoring part, the tool therefore being able to be attached in the closing mechanism by means of the insertion or passage thereof through the anchoring part, wherein the tool has an extension by way of a pin enabled for the insertion or passage thereof through the anchoring part, and wherein the anchoring part has a bulge with a through hole, the extension of the tool and the through hole of the bulge therefore being mutually enabled for the passage and insertion of the extension through the through hole.

13. The vehicle seat belt fastening device according to claim 12, wherein the extension is connected to the rest of the tool by means of a joint, such that in a condition of use the extension is inserted or in a through position in the anchoring part, the rest of the tool being able to rotate about the joint and foldable on the extension, while at the same time, the same extension is inserted or in a through position in the anchoring part.

14. The vehicle seat belt fastening device according to claim 13, wherein the rest of the tool has a slot, such that in the folded position of the rest of the tool on the extension thereof, the rest of the tool is coupled to the bulge of the anchoring part through the slot.

15. The vehicle seat belt fastening device according to claim 13, wherein the cutting means and the breaking means are arranged in the rest of the tool, which is able to rotate about the joint and able to fold on the extension.

16. The vehicle seat belt fastening device according to claim 13, further comprising a safety sealing mechanism enabled to keep the tool in the insertion or passage position of the tool through the anchoring part.

17. The vehicle seat belt fastening device according to claim 16, wherein the sealing mechanism comprises a pin that is mutually enabled with the extension and the rest of the tool, allowing for a simultaneous passage of the pin through the extension and through the rest of the tool in the condition of use in which the extension is inserted or in a through position in the anchoring part, and in which the rest of the tool is in a folded position on the extension, while the same extension is inserted or in a through position in the anchoring part at the same time.

18. The vehicle seat belt fastening device according to claim 17, wherein the extension and the rest of the part have through holes suitable for the pin to simultaneously pass therethrough.

* * * * *